United States Patent
Lee et al.

(10) Patent No.: US 9,337,753 B2
(45) Date of Patent: May 10, 2016

(54) SYSTEM AND METHOD FOR COLD START OF VEHICLE

(71) Applicants: Hyundai Motor Company, Seoul (KR); Kia Motors Corporation, Seoul (KR)

(72) Inventors: Joon Yong Lee, Seoul (KR); Soon Woo Kwon, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 1 day.

(21) Appl. No.: 14/548,566

(22) Filed: Nov. 20, 2014

(65) Prior Publication Data

US 2016/0006374 A1    Jan. 7, 2016

(30) Foreign Application Priority Data

Jul. 3, 2014    (KR) .......................... 10-2014-0083178

(51) Int. Cl.
*H02P 6/20* (2006.01)
*H02P 1/46* (2006.01)

(52) U.S. Cl.
CPC ........................................ *H02P 1/46* (2013.01)

(58) Field of Classification Search
CPC ..................................... H02P 1/46; H02P 6/20
USPC .......... 318/400.11, 807, 400.26, 700, 400.01, 318/727; 429/434, 432, 431, 442; 180/65.21, 65.31
See application file for complete search history.

(56) References Cited

U.S. PATENT DOCUMENTS

| | | | | |
|---|---|---|---|---|
| 4,739,277 A | * | 4/1988 | Hollister | G01R 13/32 327/232 |
| 4,846,128 A | * | 7/1989 | Yagi | F02P 5/106 123/406.27 |
| 4,941,079 A | * | 7/1990 | Ooi | H02J 3/36 363/132 |
| 6,677,724 B1 | * | 1/2004 | Kim | H02P 6/18 318/700 |
| 6,692,851 B2 | * | 2/2004 | Keskula | B60L 11/1881 429/431 |
| 6,847,188 B2 | * | 1/2005 | Keskula | B60L 11/1881 320/101 |
| 7,645,533 B2 | * | 1/2010 | Fukuda | H01M 8/04007 429/434 |
| 8,342,276 B2 | * | 1/2013 | Murakami | B60L 11/1887 165/80.4 |
| 8,356,682 B2 | * | 1/2013 | Grieve | B60L 11/1881 180/65.1 |
| 8,519,653 B2 | * | 8/2013 | Takamatsu | H02P 27/08 318/400.13 |
| 8,602,141 B2 | * | 12/2013 | Yee | B60L 11/1859 180/65.21 |
| 8,665,623 B2 | * | 3/2014 | Suzuki | H02M 7/003 363/141 |
| 8,686,671 B2 | * | 4/2014 | Jeon | B60L 11/18 318/400.01 |
| 8,866,435 B2 | * | 10/2014 | Suhama | H02P 27/085 318/400.09 |
| 2002/0011327 A1 | * | 1/2002 | Fukazu | F28F 3/04 165/80.4 |
| 2006/0222910 A1 | * | 10/2006 | Aoyagi | B60H 1/00392 429/432 |
| 2006/0280977 A1 | * | 12/2006 | Sakajo | B60L 11/1885 429/429 |
| 2009/0240389 A1 | * | 9/2009 | Nomura | B62D 5/046 701/31.4 |

FOREIGN PATENT DOCUMENTS

JP    2006-344498 A    12/2006
JP    2010-022179 A    1/2010

(Continued)

*Primary Examiner* — Rita Leykin
(74) *Attorney, Agent, or Firm* — Mintz Levin Cohn Ferris Glovsky and Popeo, P.C.; Peter F. Corless

(57) ABSTRACT

A system and method for a cold start of a vehicle are provided. The method includes setting a target electrical angle by adding a setting angle to a previously stored initial electrical angle of a driving motor and applying an electric current value that corresponds to the set target electrical angle to the driving motor.

19 Claims, 4 Drawing Sheets

(56) References Cited

FOREIGN PATENT DOCUMENTS

| JP | 2011-211775 A | 10/2011 |
|---|---|---|
| JP | 2013-090434 A | 5/2013 |
| KR | 10-2003-0050454 | 6/2003 |
| KR | 10-2010-0051509 A | 5/2010 |
| KR | 10-2011-0109433 | 10/2011 |
| KR | 10-2012-0000634 | 1/2012 |
| KR | 10-2013-0053037 A | 5/2013 |

* cited by examiner

FIG. 4

| TIME | U PHASE ELECTRICAL CURRENT | V PHASE ELECTRICAL CURRENT | W PHASE ELECTRICAL CURRENT |
|---|---|---|---|
| (1) | 550A | 0A | −550A |
| (2) | 0A | 550A | −550A |
| (3) | −550A | 550A | 0A |
| (4) | −550A | 0A | 550A |
| (5) | 0A | −550A | 550A |
| (6) | 550A | −550A | 0A |

SYSTEM AND METHOD FOR COLD START OF VEHICLE

CROSS-REFERENCE TO RELATED APPLICATION

The present application claims priority of Korean Patent Application Number 10-2014-0083178 filed on Jul. 3, 2014, the entire contents of which application are incorporated herein for all purposes by this reference.

BACKGROUND (a) Technical Field

The present invention relates to a system and method for a cold start of a vehicle, and more particularly, to a method for a cold start of a vehicle, through which a required output of a fuel cell is increased by applying load of electrical current to a driving motor while preventing overload from being applied to an inverter between the fuel cell and the driving motor.

(b) Description of the Related Art

Generally, a fuel cell vehicle is a vehicle that obtains power from a driving motor using electricity generated by a reaction between oxygen and hydrogen in a fuel cell. Since the energy source to obtain power is a fuel cell, the driving force of a vehicle can be influenced according to output of the fuel cell, and when cold-starting a vehicle, that is, when the vehicle is started under a circumstance where the fuel cell is not sufficiently preheated, the power of the fuel cell is not output thus causing deterioration of performance of the fuel cell.

Accordingly, various methods have been developed to promptly preheat the fuel cell, for example a method has been developed for increasing the flow rate of cooling water and the heat generation rate of a fuel cell by heating the cooling water and maximally driving a pump for the cooling water. However, such a conventional method causes overloads on the pump for cooling water and requires separately provided devices for heating the cooling water, and thus is not effective in terms of cost and efficiency.

The description provided above as a related art of the present invention is merely for helping in the understanding of the background of the present invention and should not be construed as being included in the related art known by those skilled in the art.

SUMMARY

The present invention provides a system and method for a cold start of a vehicle, in which a required output of a fuel cell may be increased by applying a load of electrical current to a driving motor not to be rotated and damage to an inverter between the fuel cell and the driving motor may be prevented, which may be caused from electric current being applied therethrough.

In one aspect, the present invention provides a method for a cold start of a vehicle, that may include: setting a target electrical angle by adding a set angle to an initial electrical angle of a driving motor, which has been previously stored, based on the cold start of the vehicle; and applying an electric current value that corresponds to the set target electrical angle to the driving motor. The previously stored initial electrical angle of a driving motor may be an electrical angle when a maximum value of sizes of a three-phase electric current value decreases (e.g., becomes a minimal value).

The method for a cold start a vehicle of may further include determining whether a set target electrical angle is about 360 degrees or greater. When the set target electrical angle is about 360 degrees or greater, an electrical angle resulting from subtracting 360 degrees from the target electrical angle may be set as the target electrical angle. In addition, an application of an electric current value that corresponds to the set target electrical angle to a driving motor may further include sensing at least one or more among a driving of the driving motor, excessive electric current of the driving motor, and excessive temperature of the driving motor. When at least one or more among a driving of the driving motor, excessive electric current of the driving motor, and excessive temperature of the driving motor are sensed, the electric current value may be stopped from being applied to the driving motor and the target electrical angle may be stored. After applying an electric current value to the driving motor, the target electrical angle may be stored. The initial electrical angle may be a target electrical angle stored when a preceding cold start is performed. The setting angle may be about 60 degrees. After the cold start is finished, the target electrical angle may be stored.

BRIEF DESCRIPTION OF THE DRAWINGS

The above and other features of the present invention will now be described in detail with reference to exemplary embodiments thereof illustrated by the accompanying drawings which are given hereinbelow by way of illustration only, and thus are not limitative of the present invention, and wherein:

FIG. 4 is an exemplary table illustrating the size of three-phase electric current value at the times where cold starting of FIG. 2 is attempted according to an exemplary embodiment of the present invention.

Figure 1:
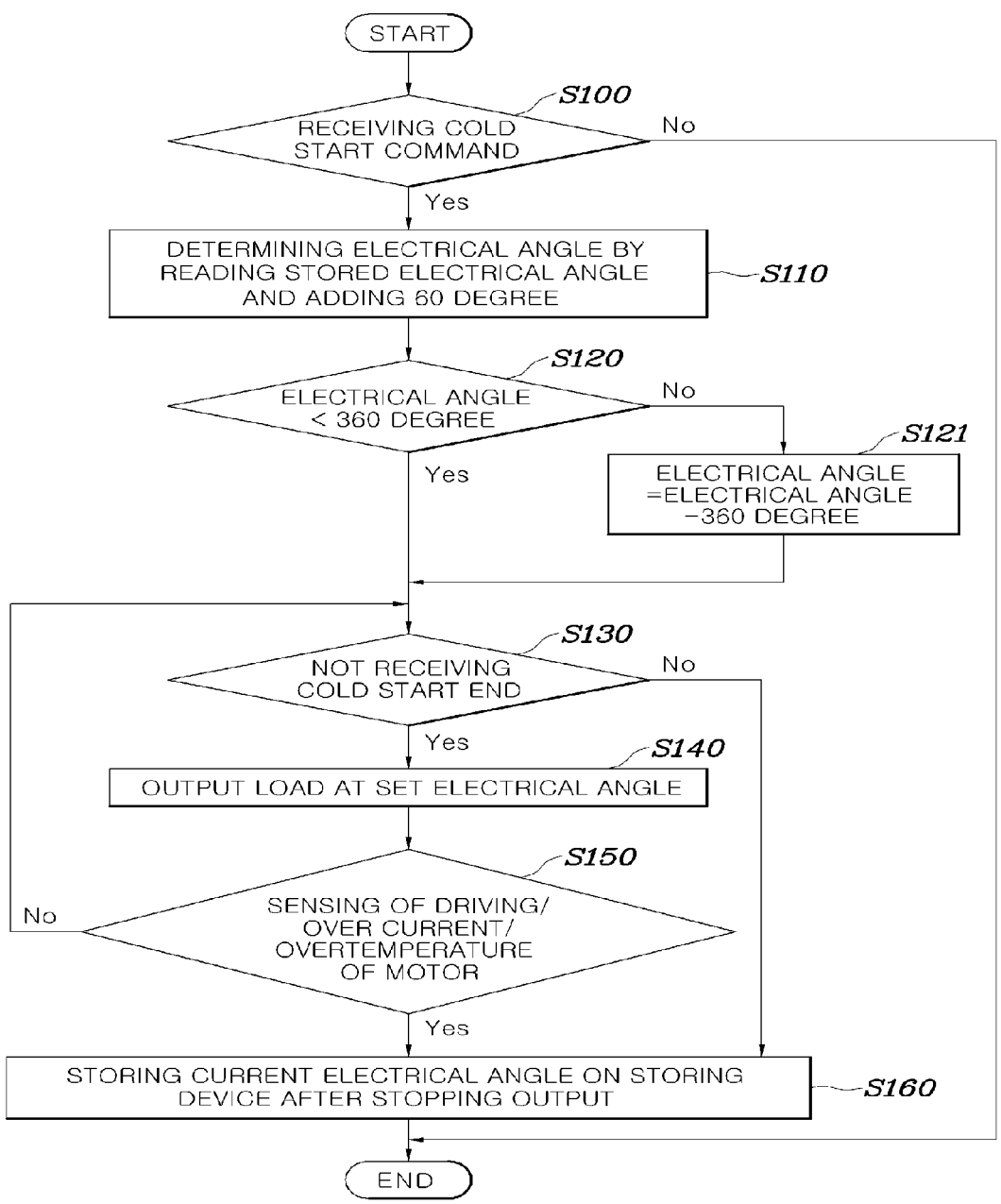
FIG. 1 is an exemplary flow chart illustrating a method for a cold start of a vehicle according to an exemplary embodiment of the present invention.

It should be understood that the appended drawings are not necessarily to scale, presenting a somewhat simplified representation of various exemplary features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will now be made in detail to various exemplary embodiments of a method for a cold start of a vehicle of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, a method for a cold start of a vehicle according to an exemplary embodiment of the present invention will be described with reference to the accompanying drawings.

Figure 2:
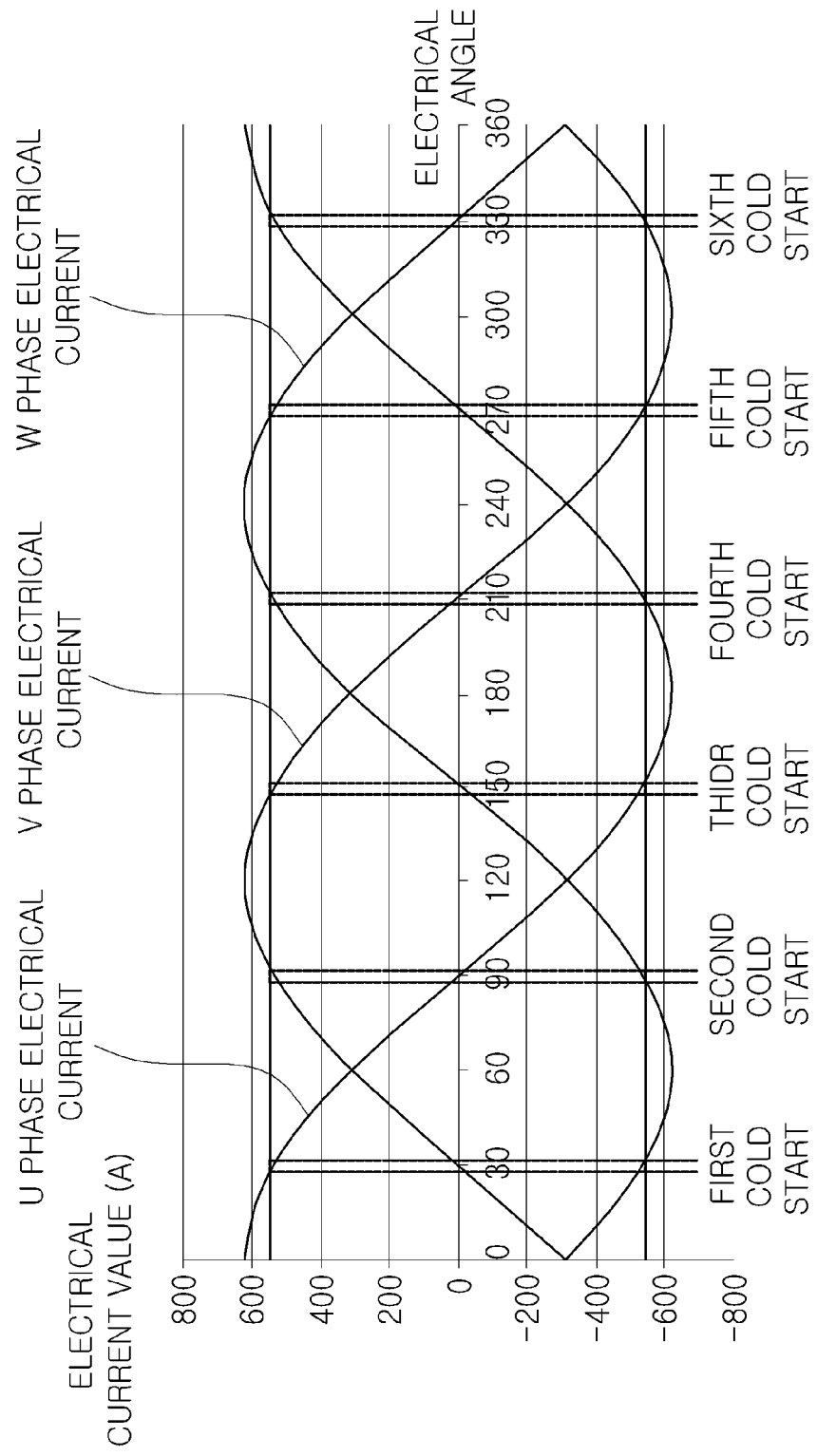
FIG. 2 is an exemplary graph illustrating the size of three-phase electric current according to an exemplary electrical angle of the present invention.
Figure 3A:
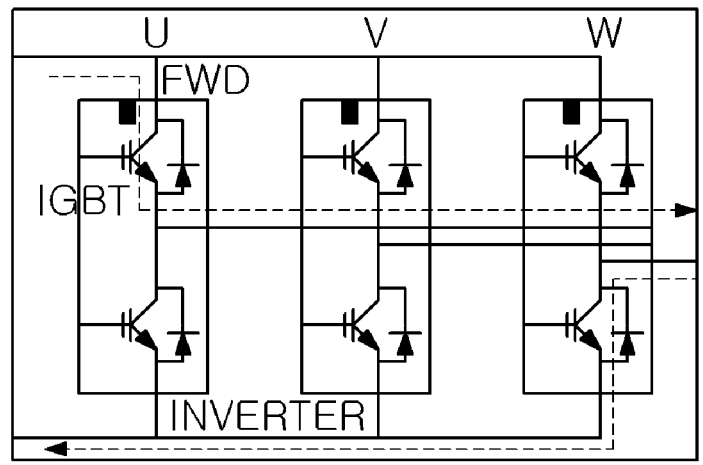
FIG. 3A is an exemplary view illustrating an operational structure of a switch according to an exemplary embodiment of the present invention.
Figure 3B:
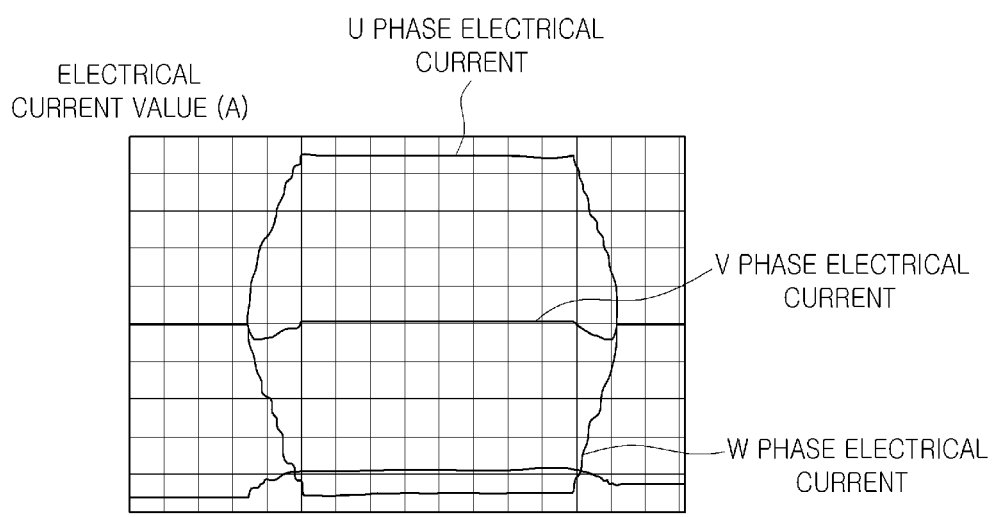
FIG. 3B is an exemplary graph illustrating the size of three-phase electric current when applying electric current values to a driving motor according to an exemplary embodiment of the present invention.

FIG. 1 is an exemplary flow chart illustrating a method for a cold start of a vehicle according to an exemplary embodiment of the present invention, FIG. 2 is an exemplary graph illustrating the size of three-phase electric current according to an electrical angle of the present invention, FIG. 3A is an exemplary view illustrating an operational structure of a switch according to an exemplary embodiment of the present invention, FIG. 3B is an exemplary graph illustrating the size of three-phase electric current when applying electric current values to a driving motor according to an exemplary embodiment of the present invention, and FIG. 4 is an exemplary table illustrating the size of three-phase electric current value at the times where cold starting of FIG. 2 is attempted.

Firstly, a method for a cold start of a vehicle according to an exemplary embodiment of the present invention, referring to FIG. 1, may include: setting, by a controller, a target electrical angle by adding a setting angle to an initial electrical angle of a driving motor, which has been previously stored, when a vehicle is cold started S110; and applying, by the controller, an electric current value that corresponds to the set target electrical angle to the driving motor S140.

In particular, the driving motor may be a driving motor supplied with electric power from a fuel cell and may be a three-phase motor rotated by receiving a three-phase alternating current. In addition, an inverter configured to transform direct electric current output from a fuel cell into an alternative electric current and output the current to the driving motor may be disposed between the fuel cell and the driving motor.

When a cold starting signal of a fuel cell is received S100, the controller may be configured to set a target electrical angle by adding a setting angle to a previously stored initial electrical angle of the driving motor S110, and further the initial electrical angle of the driving motor, may be an electrical angle when a maximum value of sizes of three-phase electric current value output from the inverter decreases (e.g., becomes a minimal value). When the cold starting signal of a fuel cell is not received S100, the preset output of the inverter, driving motor, and fuel cell may be adjusted.

As can be seen through an electrical angle where a cold start of FIG. 2 is performed, the electrical angle where a maximum value of sizes of the three-phase electric current value becomes minimal refers to an electrical angle having a smallest maximum value when comparing a maximum value of sizes of three-phase electric current values at a specific electrical angle by each electrical angle. When a maximum value of sizes of the three-phase electric current value decreases repeatedly per a frequency of the setting angle, the cold start may be performed at the target electrical angle to which the setting angle is added when a cold start is performed. Accordingly, loads to be applied on the inverter may be reduced while loads to be applied to the driving motor may be maintained, through the configuration as described above.

In particular, since a maximum value of a three-phase electric current value output from a fuel cell and applied to a driving motor may be beyond a maximum permissible electric current value of an inverter and an electric current value applied to the driving motor may be adjusted to be within the maximum permissible electric current value of the inverter. Accordingly, a value may be determined that causes a maximum value of sizes of the three-phase electric current value to decrease within a maximum permissible electric current value of the inverter and an electric current value corresponding to a specific electrical angle may be applied to the driving motor, thus maintaining loads applied to the driving motor, and simultaneously reducing loads to be applied to the inverter. The setting angle may be about 60 degrees, but may not be limited thereto.

Further, after setting the target electrical angle S110, the controller may be configured to determine whether the set target electrical angle is about 360 degrees or greater may be further performed S120, and when the set target electrical angle is about 360 degrees or greater, an electrical angle resulting from subtracting 360 degrees from the target electrical angle may be set as a target electrical angle S121. Since a total of the electrical angle may be varied to about 720 degrees, 1,080 degrees, etc. beyond 360 degrees based on the number of phases, and electric current values at electrical angles beyond about 360 degrees have about the same electric current values as an electric angel resulting from subtracting 360 degrees therefrom, the target electrical angle may be repeatedly applied regardless of the size of entire electrical angle.

Furthermore, after the target electrical angle is set S110, the controller may be configured to determine whether a cold start is complete S130, and when the cold start remains in progress, a three-phase electric current value that corresponds to the target electrical angle may be applied to the driving motor S140. Accordingly, the electric current value on the phase that corresponds to a maximum value and a minimum value among the electrical current values corresponding to the target electrical angle may be applied to the inverter.

As shown in FIGS. 3A and 3B, a plurality of switches may be disposed on the inverter to transform a direct current into an alternating current wherein the switches may be disposed adjacent to each phase such that electric current is applied to a corresponding phase by the connection of the switches or a flowing direction of the electric current may be varied. The switches may be an Insulated Gate Bipolar Transistor (IGBT), but may not be limited thereto. The structure of the inverter is described variously according to a related art and thus detailed description thereof is omitted.

FIG. 3A is an exemplary view illustrating an operational structure of the switch at a first time when the cold start of FIG. 2 is attempted and FIG. 3B is an exemplary view illustrating the size of a three-phase electric current value at the first time at which the cold start of FIG. 2 is attempted wherein it is shown that the switches that correspond to a maximum electric current value and a minimum electric current value at an electrical angle where the cold start is attempted may be operated. In particular, FIGS. 3A and 3B illustrate switches that correspond to a U-phase and a W-phase of three phases being operated, but it is natural to be applied in an identical manner even at remaining times to be followed.

As described above, the intention of not operating all switches corresponding to each phase is to allow electric current to flow to the driving motor without driving thereof, and when all the three-phases are applied, the driving motor may be driven and accordingly load to be applied to the driving motor may be decreased and to thus limit the output increase of the fuel cell.

FIG. 4 illustrates sizes of a three-phase electric current value at the times when the cold start of FIG. 2 is attempted, wherein the number on the left side represents a time. As shown in FIG. 4, as a cold start is repeated, loads are distributed substantially evenly on the phases to prevent distribution on only one of the inverter switches thus improving the life span of inverter and driving motor. The present exemplary embodiment considers a case when a maximum permissible electric current of an inverter may be about 550 A, an electric current value wherein a maximum value of sizes of the three-phase electric current value decreases may be about 550 A, and the maximum value of the three-phase electric current value may be 620 A.

Moreover, an application of an electric current value that corresponds to the set target electrical angle to a driving motor S140 may further include sensing at least one or more among a driving of a driving motor, excessive electric current of a driving motor (e.g., electric current greater than a predetermined current), and excessive temperature of a driving motor S150 (e.g., temperature greater than a predetermined temperature). The application of electric current to a driving motor may preheat a fuel cell by generating loads on the driving motor, when at least one or more among a driving of a driving motor, excessive electric current of a driving motor, and excessive temperature of a driving motor are sensed, the application of the electric current value to the driving motor may be terminated and the target electrical angle may be stored S160.

The stored target electrical angle may be used as an initial electrical angle when a cold start is performed at the next time (e.g., at a second time), and when information regarding a stored preceding target electrical angle is not provided, a preset electrical angle of electrical angles that correspond to an electric current value that a maximum value of sizes of a three-phase electric current value becomes minimal may be used.

According to a method for a cold start of a vehicle which is configured as described above, a fuel cell may be preheated by applying loads on existing driving motor without requiring separate preheating devices, thereby taking advantages of simplicity in design and efficiency of cost reduction. In addition, it may be possible to prevent damage to a driving motor and an inverter to improve the endurance of the inverter and driving motor.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A method for a cold start of a vehicle, comprising:
    setting, by a controller, a target electrical angle by adding a set angle to a previously stored initial electrical angle of a driving motor based on the cold start of the vehicle; and
    applying, by the controller, an electric current value that corresponds to the set target electrical angle to the driving motor.

2. The method for a cold start of a vehicle of claim 1, wherein the previously stored initial electrical angle of a driving motor is an electrical angle when a maximum value of sizes of a three-phase electric current value decreases.

3. The method for a cold start a vehicle of claim 1, further comprising:
    determining, by the controller, whether a set target electrical angle is 360 degrees or greater.

4. The method for a cold start a vehicle of claim 3, wherein when the set target electrical angle is 360 degrees or greater, an electrical angle resulting from subtracting 360 degrees from the target electrical angle is set as the target electrical angle.

5. The method for a cold start of a vehicle of claim 1, wherein an application of an electric current value that corresponds to the set target electrical angle to a driving motor further includes:
    sensing, by the controller, at least one or more among a driving of the driving motor, excessive electric current of the driving motor, and excessive temperature of the driving motor.

6. The method for a cold start of a vehicle of claim 5, wherein when at least one or more among a driving of the driving motor, excessive electric current of the driving motor, and excessive temperature of the driving motor are sensed, the electric current value is prevented from being applied to the driving motor and the target electrical angle is stored.

7. The method for a cold start a vehicle of claim 1, wherein after the application of an electric current value to the driving motor, the target electrical angle is stored.

8. The method for a cold start a vehicle of claim 1, wherein the initial electrical angle is a target electrical angle that is stored when a preceding cold start is performed.

9. The method for a cold start of a vehicle of claim 1, wherein the setting angle is 60 degrees.

10. The method for a cold start of a vehicle of claim 1, wherein after the cold start is completed, the target electrical angle is stored.

11. A system for a cold start of a vehicle, comprising;
a memory configured to store program instructions; and
a processor configured to execute the program instructions, the program instructions when executed configured to:
set a target electrical angle by adding a set angle to a previously stored initial electrical angle of a driving motor based on the cold start of the vehicle; and
apply an electric current value that corresponds to the set target electrical angle to the driving motor.

12. The system for a cold start of a vehicle of claim 11, wherein the previously stored initial electrical angle of a driving motor is an electrical angle when a maximum value of sizes of a three-phase electric current value decreases.

13. The system for a cold start of a vehicle of claim 11, wherein the program instructions when executed are further configured to:
determine whether a set target electrical angle is 360 degrees or greater.

14. The system for a cold start of a vehicle of claim 13, wherein when the set target electrical angle is 360 degrees or greater, an electrical angle resulting from subtracting 360 degrees from the target electrical angle is set as the target electrical angle.

15. The system for a cold start of a vehicle of claim 11, wherein an application of an electric current value that corresponds to the set target electrical angle to a driving motor further includes program instructions that when executed are configured to:
sense at least one or more among a driving of the driving motor, excessive electric current of the driving motor, and excessive temperature of the driving motor.

16. A non-transitory computer readable medium containing program instructions executed by a processor or controller, the computer readable medium comprising:
program instructions that set a target electrical angle by adding a set angle to a previously stored initial electrical angle of a driving motor based on the cold start of the vehicle; and
program instructions that apply an electric current value that corresponds to the set target electrical angle to the driving motor.

17. The non-transitory computer readable medium of claim 16, wherein the previously stored initial electrical angle of a driving motor is an electrical angle when a maximum value of sizes of a three-phase electric current value decreases.

18. The non-transitory computer readable medium of claim 16, further comprising:
program instructions that determine whether a set target electrical angle is 360 degrees or greater.

19. The non-transitory computer readable medium of claim 17, wherein when the set target electrical angle is 360 degrees or greater, an electrical angle resulting from subtracting 360 degrees from the target electrical angle is set as the target electrical angle.

* * * * *